United States Patent Office 2,760,979
Patented Aug. 28, 1956

2,760,979

PROCESS FOR MANUFACTURING ETHYLENE-DIAMINE HYDROCHLORIDE

Josef Wimmer, Burghausen, Upper Bavaria, Germany, assignor to Wacker-Chemie G. m. b. H., Munich, Germany, a corporation of Germany No Drawing. Application July 1, 1953,
Serial No. 365,555

Claims priority, application Germany December 6, 1952

4 Claims. (Cl. 260—585)

This invention relates to the production of ethylenediamine hydrochloride from ethylene chloride and ammonia, and it has for its object to provide a novel and improved process for this purpose.

Another object of the invention is to provide a simple and efficient continuous process for manufacturing ethylenediamine hydrochloride from ethylene chloride and ammonia, which requires considerably less equipment and maintenance than the uneconomical batch process of the prior art.

Various other objects and advantages will be apparent as the nature of the invention is more fully disclosed.

It is known that ethylene chloride transforms into ethylenediamine hydrochloride through heating with concentrated aqueous ammonia solution. In such process a great excess of ammonia must be used in order to prevent the formation of ammonium chloride as well as secondary and tertiary amines. The discontinuous or batch performance of this transformation in a large plant requires, therefore, extensive equipment and the rotation of considerable quantities of aqueous ammonia solutions.

I have now found that this transformation can be performed continuously without the foregoing disadvantages. The process according to my invention resides in the continuous production of ethylenediamine hydrochloride through transformation of ethylene chloride with an excess of ammonia at elevated temperature under pressure, and consists substantially in continuously introducing into a reaction column or tower, under pressure, gaseous ammonia or ammonia dissolved in water in the lower part of said tower, and ethylene chloride in the upper part of said tower, and drawing off the reaction liquid from above. The ethylene chloride drops through the ammonia fluid passing counter-current thereto (because of its higher specific gravity) and thereby transforms into ethylenediamine hydrochloride. The ethylene chloride is preferably finely divided and is prevented from passing through the reaction zone too fast by means of fillers or other suitable devices. The quantities of ethylene chloride and ammonia employed are regulated in such a manner that the required excess of ammonia is available for the transformation. The transformation is preferably effected at a temperature of 50–200° C. The reaction fluid drawn off in the upper part of the tower is freed from ammonia through expansion and boiling, and the ammonia is again introduced under pressure into the bottom of the transformation vessel. Through the introduction of the corresponding quantities of water into the tower the crystallization of the developing salts is prevented.

Example

Into a tower 5 m. in height and with a content of 10 l., which is filled with aqueous ammonia and heated to 100° C., 0.5 kg. of ethylene chloride are introduced under pressure from above, and 0.3 kg. of ammonia and 0.2 l. of water are introduced under pressure from below. At the upper part of the tower approximately the same quantity as contained in the formed ethylenediamine hydrochloride is constantly being drawn off. From this about 0.6 kg. of ethylenediamine hydrochloride is recovered after distilling out the ammonia, and this product contains a maximum of 1.0% ammonium chloride.

Although a specific example is given herein for purposes of illustration, it will be evident to those skilled in the art that the invention is capable of various modifications and adaptations within the scope of the appended claims.

The invention claimed is:

1. Process for continuously producing ethylenediamine hydrochloride by reacting ethylene chloride with an excess of ammonia in a reaction tower, which comprises continuously introducing the ethylene chloride under pressure into the upper part of said tower, continuously introducing the ammonia under pressure into the lower part of said tower, and continuously removing the reaction liquid from the upper part of said tower.

2. Process according to claim 1, in which the reaction is performed at a temperature of 50–200° C.

3. Process according to claim 2, in which the ammonia is continuously separated from the removed reaction liquid and is reintroduced under pressure into the lower part of said tower.

4. Process according to claim 2, in which fillers retard the passage of the ethylene chloride through the reaction zone.

References Cited in the file of this patent

UNITED STATES PATENTS

| | | |
|---|---|---|
| 1,832,534 | Curme et al. | Nov. 17, 1931 |
| 2,028,041 | Bersworth | Jan. 14, 1936 |
| 2,049,467 | Mnookin | Aug. 4, 1936 |
| 2,113,640 | Barbieri et al. | Apr. 12, 1938 |
| 2,164,587 | McKee et al. | July 4, 1939 |